Jan. 30, 1923. 1,443,669
J. M. ANDERSEN.
ELECTRICAL CONNECTION.
FILED APR. 4, 1921.
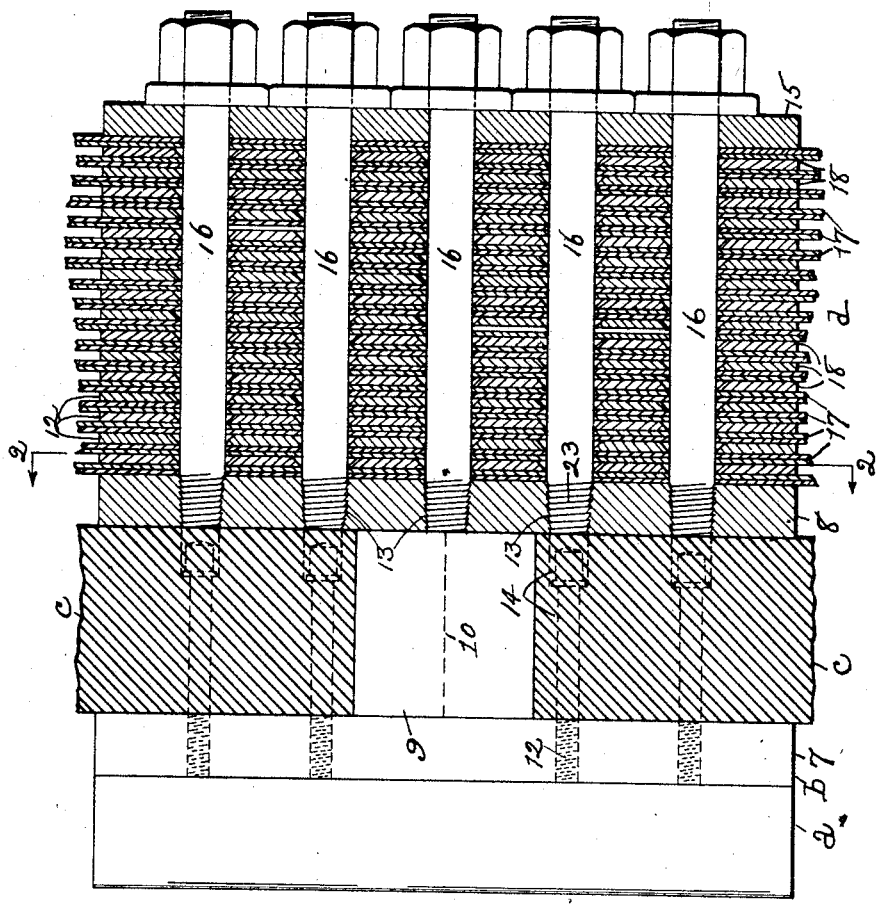
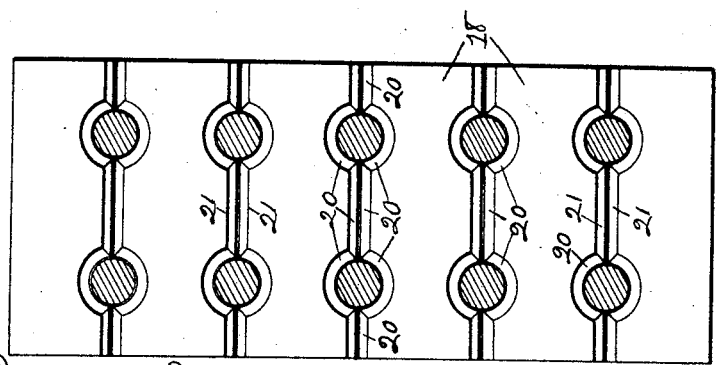
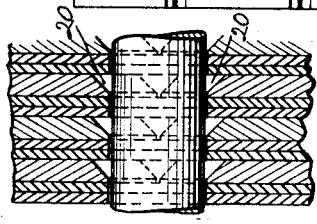
Inventor:
Johan M. Andersen
by Jas. H. Churchill
atty.

Patented Jan. 30, 1923.

1,443,669

UNITED STATES PATENT OFFICE.

JOHAN M. ANDERSEN, OF BOSTON, MASSACHUSETTS, ASSIGNOR TO ALBERT & J. M. ANDERSON MANUFACTURING COMPANY, OF BOSTON, MASSACHUSETTS, A CORPORATION OF MAINE.

ELECTRICAL CONNECTION.

Application filed April 4, 1921. Serial No. 458,420.

*To all whom it may concern:*

Be it known that I, JOHAN M. ANDERSEN, a citizen of the United States, residing in Boston, in the county of Suffolk and State of Massachusetts, have invented an Improvement in Electrical Connections, of which the following description, in connection with the accompanying drawings, is a specification, like characters on the drawings representing like parts.

This invention relates to an electrical connection and is herein shown as embodied in a bus bar construction to which is attached the stationary member of an electric switch.

The invention is especially designed and adapted for use in bus bar constructions carrying large currents, which bus bars are usually composed of a plurality of pairs of laminations, and interposed spacing devices or washers, and said bus bar is usually clamped by bolts between a back plate or member and a terminal block or member.

Bus bars of the character described are frequently required to carry excessive currents, and when this occurs the bolts which afford a good path for the current become heated and under this influence elongate, and slacken or diminish the compression intended to be exerted upon the laminated bus bar between the terminal block and the back plate, with the result that the efficiency of the connection between the bus bar and the back plate and the terminal block is materially diminished.

The present invention has for its object to provide a bus bar construction, wherein provision is made for ventilating the bolts, whereby the latter are prevented from being heated to such extent as to cause them to elongate materially, so that when the bus bar is carrying an excessive current, the bolts are maintained relatively cool with respect to the bus bar, with the result that instead of the electrical efficiency of the bus bar being diminished by the elongation of the bolts as above pointed out, the efficiency of the bus bar is increased, as the compression upon the laminations of the bus bar is increased by the expansion of the latter against the back plate and the terminal block or member.

The bolts may be ventilated by providing the bus bar with air passages or channels, which are arranged with relation to the bolts, so as to cause the air passing up through said passages or channels to impinge upon the bolts and carry the heat away therefrom and thus maintain them in the relatively cool condition desired.

The invention further has for its object to obtain a superior electrical and mechanical connection between the bolts and the terminal block or bar. To this end, the bolts are provided with tapered ends having buttress screw-threads which engage suitably threaded sockets in the terminal bar or connection.

These and other features of this invention will be pointed out in the claims at the end of this specification.

Fig. 1 represents a sufficient portion of a bus bar construction embodying this invention to enable it to be understood.

Fig. 2, a section on the line 2—2, Fig. 1, looking in the direction of the arrow thereon, and Fig. 3, a detail on an enlarged scale of a portion of one of the bolts and of the bus bar.

Referring to the drawing, $a$ represents the stationary member of an electric switch, which is secured to a terminal block $b$, which as herein shown comprises a pair of substantially parallel metal plates or members 7, 8, and a connecting central web 9. Between the plates or members 7, 8, is located a panel or board $c$ of slate or other insulating material, which is made in sections, provided at their upper and lower edges with recesses which permit the sections of the panel or board $c$ to be fitted about the web 9 and have their ends abut as represented by the dotted line 10 in Fig. 1. The terminal block $b$ is secured to the panel or board $c$ by screws 12 which are passed through suitable holes 13 in the member 8 and through suitable holes 14 in the panel board $c$ and are threaded into the member 7 of the terminal block $b$. The member 8 of the terminal block $b$ has co-operating with it a bus bar $d$ embodying this invention, and said bus bar is clamped against the member 8 by a back plate or compressing member 15 which is secured to the terminal block by bolts 16.

The bus bar $d$ herein shown is composed of a plurality or series of parallel members 17 of copper or other suitable conducting material, and spacing plates or washers 18 of copper or other suitable conducting material which are interposed between adjacent members 17 and are secured in intimate contact therewith by means of the bolts 16. Each member 17 of the bus bar is shown as composed of a pair of thin strips, plates or laminæ, and the spacing members or washers 18 may be of any suitable thickness within in limits.

By reference to Fig. 1, it will be observed that the bolts 16 afford a good path for the current from the terminal member 8 to the back plate 15 and thence to the bus bar $d$ and vice versa, and when an excessive current, especially an excessively heavy current, passes through said bolts, the latter in the absence of the present invention would become materially heated and caused to elongate, with the result that the compression on the bus bar would be slackened or diminished and the contact between the bus bar $d$ and the terminal member 8 and the back plate 15 diminished, as well as the contact between the members of the bus bar, which creates more or less resistance and thereby diminishes the electrical efficiency of the bus bar.

To avoid this, provision is made for ventilating the bolts 16, so that as heat is generated therein, it is carried away by currents of air, which impinge upon the bolts, and thereby keep them cool with relation to the bus bar.

To this end, air passages 20 are formed between adjacent laminæ or members 17 which are arranged with relation to the bolts 16, so that the air passing through them impinges upon the bolts, and it is preferred that said air passages should pass entirely around the bolts. The air passages may be formed in the washer or spacing member 18 between the sides thereof, or at the side or edge of said member as herein shown. In Fig. 2, it will be seen that the endmost spacing members or washers 18 are provided with beveled edges 21 at one side, while the intermediate spacing members are provided with beveled edges 21 at both sides.

The beveled edges 21 comprise straight and curved portions, and the curved portions co-operate with the bolts 13 to preferably surround the same when the spacing members are assembled in their operative position between the bus bar members 17 (see Fig. 2).

By reference to Figs. 1 and 3, it will be seen that when the bus bar is assembled and secured by the bolts 16 to the terminal bar or block $b$, the beveled edges 21 of the spacing members form the air passages 20 through the bus bar, and that the air below the bus bar can pass up through the passages, around the bolts in contact therewith and out from the top of the bus bar, carrying with it the heat created at the bolts, thereby keeping the bolts cool and also keeping down the electrical resistance, and thereby increasing the electrical efficiency of the same, as above pointed out.

The electrical efficiency of the bus bar may be further increased by providing the bolts 16 with tapered front ends, which are provided with buttress screw-threads 23 which engage the correspondingly threaded sockets or openings 13 in the member 8 of the terminal bar or block $b$. It will be observed that the buttress screw-threads taper from the full diameter of the bolt, and thereby obtain a most efficient electrical and mechanical connection with the terminal bar or block $b$.

One construction or arrangement for ventilating the bolts 16 of the bus bar is herein shown, but it is not desired to limit the invention to the particular construction shown.

While the invention is herein shown as embodied in a bus bar to which the stationary member of an electric switch is secured, it is not desired to limit the invention in this respect. A bus bar such as herein shown has been successfully employed for carrying a current of twenty thousand amperes.

Claims:

1. In an electrical connection, in combination, a terminal member, a bus bar comprising a plurality of laminæ and spacing members between adjacent laminæ provided with means for forming air passages through the bus bar, a back plate co-operating with said bus bar, and bolts for clamping said bus bar between said back plate and said terminal member, said means being arranged with respect to the said bolts to cause the air passing through said passages to impinge upon said bolts and carry away heat therefrom.

2. In an electrical connection, in combination, a terminal member, a pair of bus bar members, bolts passing through said bus bar members to connect the same with said terminal member, a spacing member between said pair of bus bar members constructed and arranged to form an air passage through the bus bar contiguous to said bolts to cause air passing through the bus bar to impinge upon said bolts.

3. In an electrical connection, in combination, a terminal member provided with sockets having buttress threads extended from the full diameter of the socket toward one end thereof, a plurality of bus bar members, bolts passing through said bus bar members and provided with buttress screw-threads for engaging the buttress screw-threads of said sockets, spacing members between adjacent bus bar members, said spacing members having means for forming an air passage and arranged with relation to said bolts to cause air passing through said passage to impinge upon said bolts.

4. In an electrical connection, in combination, a terminal member, a bus bar, bolts extended through said bus bar to said terminal member, for securing the bus bar to said terminal member and means for forming air passages within the bus bar and contiguous to said bolts for ventilating the latter.

5. In an electrical connection, in combination, a bus bar, metallic devices extended through said bus bar, and means for forming air passages through said bus bar between its sides and ends and contiguous to said metallic devices to ventilate the latter.

In testimony whereof, I have signed my name to this specification.

JOHAN M. ANDERSEN.